June 5, 1928.
W. A. ANGLEMYER
TUBE STEM
Filed Oct. 27, 1927
1,671,961
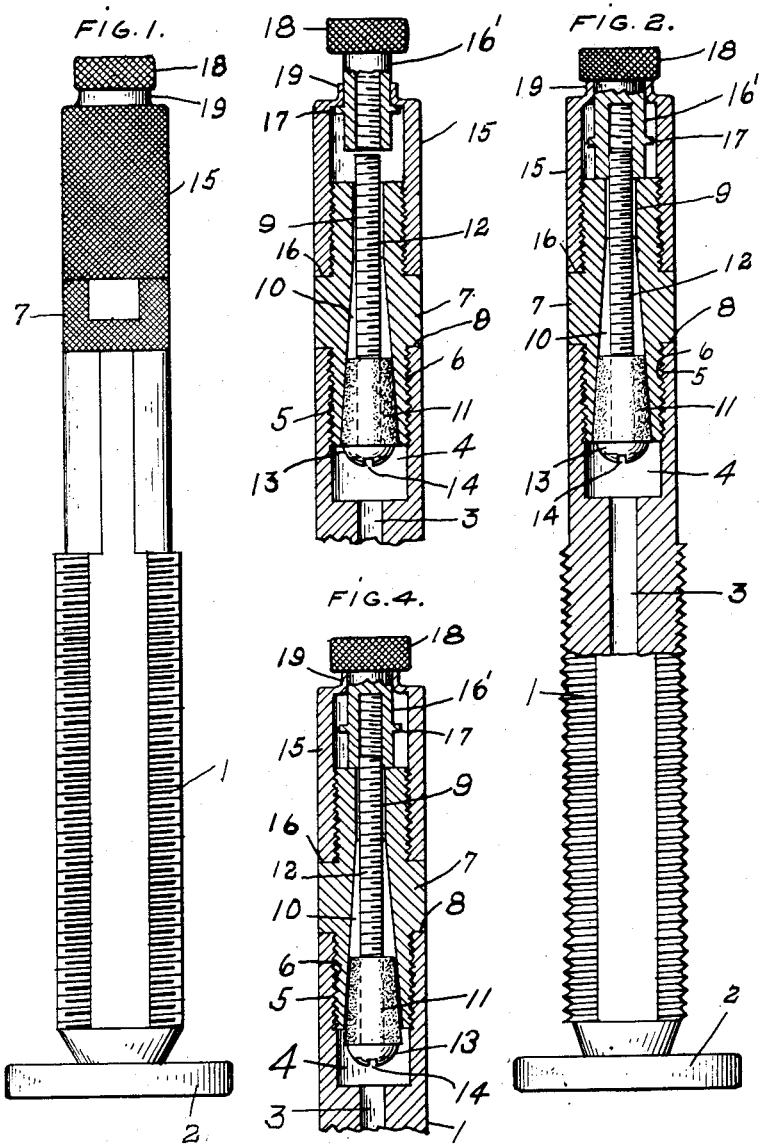
INVENTOR.
WILLIARD A. ANGLEMYER
BY
Owen H. Spoun
ATTORNEY Patented June 5, 1928.

1,671,961

UNITED STATES PATENT OFFICE.

WILLIARD A. ANGLEMYER, OF INDIANAPOLIS, INDIANA.

TUBE STEM.

Application filed October 27, 1927. Serial No. 229,240.

This invention relates to tube stems and primarily adapted for use in connection with inner tubes for automobile tires and one feature of the invention is the provision of a valve and seat so constructed that when the valve is in closed position, leakage around the valve will be prevented.

A further feature of the invention is in so constructing the stem that the parts thereof will be reduced to a minimum, and which may be produced at a small cost.

A further feature of the invention is the provision of means for positively locking the valve against its seat and maintain the same in such position until air is to be again entered in the tube.

A further feature of the invention is in so constructing the valve and locking member that the air within the tube may be released without removing the cap from the stem.

A further feature of the invention is the provision of means for permanently connecting the locking mechanism with the dust cap and in such manner that said locking mechanism may have independent movement with respect to the cap.

Other objects and advantages will be hereinafter more fully set forth and pointed out in the accompanying specification.

In the accompanying drawing which is made a part of this application,

Figure 1 is an elevation of the tube stem in assembled position.

Figure 2 is a similar view showing the upper portion of the stem in section.

Figure 3 is a sectional view through the upper portion of the stem with the locking mechanism in position for the removal of the dust cap, and Figure 4 is a similar view showing the manner of releasing the air without removing the dust cap.

Referring to the drawing, 1 indicates the tube stem proper, which has a head 2 at its inner end as is usual and a central longitudinal bore 3, the lower portion of the stem being exteriorly threaded to receive the usual form of locking nut, (not shown).

The outer end of the stem 1 has a cavity 4 formed therein which communicates with the bore 3, said cavity being provided with threads 5 for engagement with threads 6 of an extension 7, the extension having a shoulder 8 adapted to rest upon the upper end of the stem 1 when the threaded end of the extension is properly turned into the cavity.

The extension 7 has a central air duct 9, the lower portion of which is formed into an elongated tapered seat 10, which is substantially conical in general outline and cooperating with said seat is a valve 11, also tapered to fit the taper of the seat 10.

The valve 11 is preferably formed of rubber or similar resilient material and is preferably moulded directly on to a stem 12, said stem being preferably threaded for more securely anchoring the valve on the stem and preventing the valve from longitudinal movement on the valve stem. The lower end of the valve stem 12 is provided with a head 13, in which are formed transversely extending slots 14, so that should the head rest over the end of the bore 3, air could freely pass out or into the bore.

The upper portion of the extension is also threaded for engagement with threads of a dust cap 15, the lower end of which seats against a shoulder 16 on the extension 7.

Extending through the upper end of the cap is a locking sleeve 16, said sleeve being interiorly threaded for engagement with the threads on the valve stem 12, so that by lowering the sleeve and rotating the same, the valve 11 will be drawn firmly against its seat and positively held in this position until the sleeve is released therefrom. The sleeve is provided with a rib 17 adjacent its inner end and with a head 18 at its outer end, which limit the longitudinal movement of the sleeve in both directions. In placing the sleeve in position through the end of the cap, the opening through which the sleeve passes is made of sufficient diameter to permit the rib 17 to pass therethru, after which the metal at the upper end of the cap is swedged inwardly to form a flange 19, which fits sufficiently in close relation around the sleeve to form a bearing therefor. By mounting the sleeve in this manner, it may be freely rotated or moved lengthwise while at the same time it will always remain in engagement with the cap.

When inflating the tube to which the stem is attached, the cap 15 is first removed and the air connection placed over the end of the extension in the usual manner of inflating inner tubes, this operation unseating the valve, due to the pressure on the end of the valve stem. As soon as the tube has been properly inflated, the air connection is removed, when the valve will be instantly and automatically reseated by the pressure of the air against the lower end of the valve and under all normal conditions the valve will be seated sufficiently tight to prevent any leakage between the valve and its seat.

The cap 15 is then introduced over the end of the extension and if it is desired to positively lock the valve in closed position the sleeve 16' is lowered into engagement with the end of the valve stem 12 and then rotated to thread the sleeve onto the stem, the continued rotation of the sleeve moving the lower end thereof against the end of the extension 7 and drawing the valve more firmly into engagement with its seat, and positively locking the valve against movement downwardly, and also locking the cap on the stem.

If it is desired to release a part or all of the air from the tube without removing the dust cap, the sleeve 16' is turned outwardly a distance and downward pressure applied thereon, this operation releasing the valve from its seat, as best shown in Fig. 4 of the drawings.

This application, claim and drawing is substantially the same, and is filed in the place and stead of the applicant's abandoned application, filed under Serial Number 758,218.

What I claim is:

The combination with an extension adapted to be engaged with a tube stem, said extension having an air duct therethrough, one end portion of which is tapered to form a seat, a valve adapted to engage said seat, and a threaded stem carrying said valve and projecting through said duct, of a cap for covering the outer end of said extension, an interiorly threaded locking sleeve slidably mounted in the closed end of said cap, an outwardly extending flange on the cap immediately surrounding said locking sleeve forming a guide for holding said sleeve against lateral swinging movement, and means for limiting the longitudinal movement of said sleeve inwardly and outwardly.

In testimony whereof, I have hereunto set my hand on this the 24th day of October, 1927, A. D.

WILLIARD A. ANGLEMYER.